United States Patent
Beardsworth et al.

(10) Patent No.: US 11,913,846 B2
(45) Date of Patent: Feb. 27, 2024

(54) FORCE SENSING SYSTEMS

(71) Applicant: Cirrus Logic International Semiconductor Ltd., Edinburgh (GB)

(72) Inventors: Matthew Beardsworth, Austin, TX (US); Vadim Konradi, Austin, TX (US); Bill Diehl, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 100 days.

(21) Appl. No.: 17/208,317

(22) Filed: Mar. 22, 2021

(65) Prior Publication Data

US 2021/0325265 A1 Oct. 21, 2021

Related U.S. Application Data

(60) Provisional application No. 63/013,122, filed on Apr. 21, 2020.

(30) Foreign Application Priority Data

Jun. 3, 2020 (GB) ...................................... 2008339

(51) Int. Cl.
*G01L 1/00* (2006.01)
*G01L 1/22* (2006.01)

(52) U.S. Cl.
CPC ............ *G01L 1/2281* (2013.01); *G01L 1/225* (2013.01); *G01L 1/2287* (2013.01)

(58) Field of Classification Search
CPC .... G01L 1/2281; G01L 1/2225; G01L 1/2287
See application file for complete search history.

(56) References Cited

U.S. PATENT DOCUMENTS

| | | | | |
|---|---|---|---|---|
| 3,841,150 A | * | 10/1974 | Pearson | G01L 1/2268 73/726 |
| 4,196,382 A | * | 4/1980 | Bryzek | G01L 1/2281 73/726 |
| 4,437,164 A | * | 3/1984 | Branch, III | G01L 1/2281 73/766 |
| 4,986,131 A | * | 1/1991 | Sugiyama | G01L 1/2281 73/766 |
| 5,146,788 A | | 9/1992 | Raynes | |
| 10,048,792 B1 | * | 8/2018 | Schediwy | G06F 3/0412 |

(Continued)

FOREIGN PATENT DOCUMENTS

| | | |
|---|---|---|
| EP | 2546730 A2 | 1/2013 |
| WO | 2015106183 A1 | 7/2015 |

OTHER PUBLICATIONS

European Patent Application 1980.*

(Continued)

*Primary Examiner* — Max H Noori
(74) *Attorney, Agent, or Firm* — Jackson Walker L.L.P.

(57) ABSTRACT

Compensation circuitry for compensating for a thermal effect in an output signal output by a force sensor may comprise monitoring circuitry configured to monitor one or more electrical parameters of the resistive force sensor and processing circuitry. The processing circuitry is configured to determine an absolute resistance value for the force sensor based on the one or more monitored electrical parameters and to adjust one or more operational parameters of the force sensor system based at least in part on the determined absolute resistance value.

16 Claims, 11 Drawing Sheets

(56) References Cited

U.S. PATENT DOCUMENTS

| | | | |
|---|---|---|---|
| 10,126,186 B2* | 11/2018 | Berme | G01L 5/1627 |
| 10,852,329 B2* | 12/2020 | Fernandez | G01R 15/146 |
| 2004/0226755 A1* | 11/2004 | Pottebaum | G01G 19/12 |
| | | | 177/25.13 |
| 2016/0048266 A1 | 2/2016 | Smith et al. | |
| 2017/0285864 A1 | 10/2017 | Pedder et al. | |
| 2019/0011316 A1 | 1/2019 | Klemm | |
| 2022/0336314 A1* | 10/2022 | Wang | H01L 21/4882 |

OTHER PUBLICATIONS

Google seach 2023.*
Combined Search and Examination Report under Sections 17 and 18(3), UKIPO, Application No. GB2008339.0, dated Nov. 25, 2020.
Invitation to Pay Additional Fees, Partial International Search Report and Provisional Opinion of the International Searching Authority, International Application No. PCT/GB2021/050700, dated Jun. 11, 2021.
Examination Report under Section 18(3), UKIPO, Application No. GB2008339.0, dated Sep. 1, 2021.
International Search Report and Written Opinion of the International Searching Authority, International Application No. PCT/GB2021/050700, dated Aug. 2, 2021.

* cited by examiner

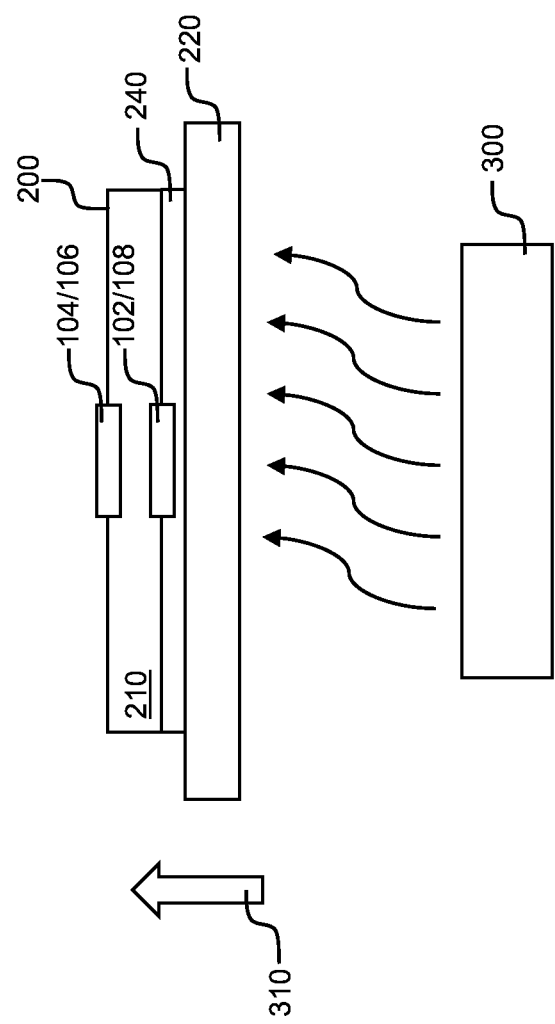

FORCE SENSING SYSTEMS

The present disclosure claims priority to U.S. Provisional Patent Application Ser. No. 63/013,122, filed on Apr. 21, 2020, and United Kingdom Patent Application No. 2008339.0, filed on Jun. 3, 2020, each of which is incorporated by reference herein in its entirety.

FIELD OF THE INVENTION

The present disclosure relates to the field of force sensing systems.

BACKGROUND

Electronic devices such as mobile phones, tablet computers and the like typically include one or more mechanical switches or buttons, i.e. user input transducers, for receiving user inputs, e.g. for adjusting a volume of audio output by the device. Such mechanical switches and buttons have a number of disadvantages, including susceptibility to damage from ingress of water, dust and other debris, limited operational life due to mechanical wear and tear, and relatively greater size and/or cost, compared to some other types of user input transducer.

Force sensors are increasingly being used as an alternative to traditional mechanical switches and buttons as user input transducers to detect user inputs such as touches, button presses and the like. Force sensors are typically less susceptible to the adverse effects of aging than mechanical switches, buttons and other types of user input transducers or devices, as they typically include either no moving parts, or fewer moving parts than a mechanical switch or button.

Additionally, force sensors can typically be implemented in such a manner that no gaps, i.e. discontinuities, exist through which water, dust or other debris can enter the sensor or a device incorporating the sensor, making them particularly suitable in applications where resistance to ingress of water, dust and other debris are important. For example, resistive force sensors can be implemented by printing patterns of resistive ink onto a suitable substrate or carrier.

Further, a force sensor typically occupies less physical space than a mechanical switch, button or the like of equivalent functionality, and so the use of force sensors can either increase the amount of space available for other components of a device or reduce the overall size of the device, both of which can be a major advantage in the design and development of modern small form-factor devices such as mobile telephones, for which the integration of multiple different functionalities in a restricted amount of space is an ever-present challenge.

Additionally, the use of force sensors can enable enhanced feature content by allowing the shape and force of a button press to be identified and mapped to a particular function and can permit, for example, the entire edge of a phone to be realised as a continuous strip of "buttons", increasing device functionality and user experience.

Thus, force sensors represent a viable and commercially attractive user input transducer alternative to traditional mechanical switches and buttons. However, the use of force sensors as input devices presents other challenges. Embodiments of the present disclosure aim to address, at least partially, some of these challenges.

According to a first aspect the invention provides compensation circuitry for compensating for a thermal effect on a resistive force sensor in a force sensor system, the compensation circuitry comprising:
 monitoring circuitry configured to monitor one or more electrical parameters of the resistive force sensor; and
 processing circuitry, wherein the processing circuitry is configured to:
  determine an absolute resistance value for the force sensor based on the one or more monitored electrical parameters; and
  adjust one or more operational parameters of the force sensor system based at least in part on the determined absolute resistance value.

The one or more monitored electrical parameters may comprise a current through the force sensor.

Additionally or alternatively, the one or more monitored electrical parameters may comprise a voltage across the force sensor.

The processing circuitry may be configured to determine a compensation factor based on an offset value between the determined absolute resistance value and an initial absolute resistance value for the force sensor.

The processing circuitry may be further configured to apply the compensation factor to adjust the one or more operational parameters of the force sensor system so as to generate a compensated force sensor output signal.

The processing circuitry may be further configured to process the compensated force sensor output signal to determine whether the compensated force sensor output signal corresponds to a valid user input.

The processing circuitry may be configured to compare the compensated force sensor output signal to a threshold to determine whether the compensated force sensor output signal corresponds to a valid user input.

The processing circuitry may be configured to compare the compensated force sensor output signal to a known signature for a valid user input to determine whether the compensated force sensor output signal corresponds to a valid user input.

The one or more operational parameters may comprise one or more of:
 an analogue gain;
 a digital gain;
 a time constant;
 a user input signal validity threshold;
 a filter coefficient;
 a cutoff frequency;
 an operating point of the force sensor;
 a bias voltage of the force sensor; and
 a bias current of the force sensor.

The processing circuitry may be further configured to:
 monitor an output voltage of the force sensor; and
 adjust the one or more operational parameters of the force sensor system based on the determined absolute resistance value and the monitored output voltage.

The processing circuitry may be configured to determine a thermal gradient compensation factor based on an offset value between the determined absolute resistance value and an initial absolute resistance value for the force sensor.

The thermal gradient compensation factor may comprise a scaling factor to be applied to the determined absolute resistance value to generate a compensated absolute resistance value.

The processing circuitry may be configured to determine a signal validity metric based on the compensated absolute resistance value and the monitored voltage.

The processing circuitry may be configured to compare the signal validity metric to a signal validity threshold.

The processing circuitry may be configured to enable processing of a force sensor output signal or a compensated force sensor output signal if the signal validity metric exceeds the signal validity threshold.

The processing circuitry may be configured to compare the force sensor output signal or the compensated force sensor output signal to a threshold to determine whether the compensated force sensor output signal corresponds to a valid user input.

The processing circuitry may be configured to compare the force sensor output signal or the compensated force sensor output signal to a known signature for a valid user input to determine whether the compensated force sensor output signal corresponds to a valid user input.

The processing circuitry may be operative to adjust the one or more operating parameters of the force sensor system based at least in part on the determined absolute resistance value in response to a predetermined condition.

The predetermined condition may be based on one or more of:
  a comparison of the determined absolute resistance value of the force sensor to a predetermined threshold;
  a comparison of a relative change in the absolute resistance of the force sensor to a target change over time;
  a comparison of the determined absolute resistance of the force sensor to an output voltage of the force sensor; or
  a comparison of the absolute resistance of a plurality of different force sensors.

According to a second aspect, the invention provides compensation circuitry for compensating for a thermal effect on a resistive force sensor in a force sensor system, the compensation circuitry comprising:
  monitoring circuitry configured to monitor an absolute resistance of the force sensor; and
  amplifier circuitry configured to amplify an output signal output by the resistive force sensor, wherein a gain of the amplifier circuitry varies based on the absolute resistance of the force sensor.

According to a third aspect, the invention provides compensation circuitry for compensating for a thermal effect on a resistive force sensor in a force sensor system, the compensation circuitry comprising:
  monitoring circuitry configured to monitor an absolute resistance of the force sensor; and
  processing circuitry configured to process an output signal output by the resistive force sensor, wherein the processing circuitry is configured to monitor a voltage of the output signal and to adjust one or more operational parameters of the force sensor system based on the determined absolute resistance value and the monitored output voltage.

According to a fourth aspect, the invention provides an integrated circuit comprising compensation circuitry according to any one of the first to third aspects.

According to a fifth aspect, the invention provides force sensor circuitry comprising a resistive force sensor and compensation circuitry according to any one of the first to third aspects.

According to a sixth aspect, the invention provides a device comprising force sensor circuitry according to the fifth aspect.

The device may comprise a mobile telephone, a tablet computer, a laptop computer, a portable media player, a gaming device, a gaming controller, an in-vehicle entertainment system, or a battery powered device.

According to a seventh aspect, the invention provides a resistive force sensor comprising a plurality of resistances arranged in a bridge, wherein the resistances are such that a force applied to the sensor causes an equal and opposite change in values of resistances in opposite sides of the bridge.

According to an eighth aspect, the invention provides a resistive force sensor according to claim 26 wherein the plurality of resistances comprises four resistances, and wherein the resistances are arranged on a sensor substrate such that two resistances are in tension and two resistances are in compression when the force is applied to the sensor.

Each of the resistances may be shaped such that when the force is applied to the force sensor a change in the resistance values of the two resistances that are in compression is equal and opposite to a change in the resistance value of the two resistances that are in tension.

Additionally or alternatively, each of the resistances may be sized such that when the force is applied to the force sensor a change in the resistance values of the two resistances that are in compression is equal and opposite to a change in the resistance value of the two resistances that are in tension.

Additionally or alternatively, a resistivity or resistance value of each of the resistances is configured such that when the force is applied to the force sensor a change in the resistance values of the two resistances that are in compression is equal and opposite to a change in the resistance value of the two resistances that are in tension.

According to a ninth aspect, the invention provides a resistive force sensor comprising a plurality of resistances arranged such that an absolute resistance of the resistive force sensor does not change when the resistivity of one or more of the plurality of resistances changes due to an applied force.

BRIEF DESCRIPTION OF THE DRAWINGS

Embodiments of the invention will now be described, strictly by way of example only, with reference to the accompanying drawings, of which:
FIG. 3 schematically illustrates a force sensor that is mounted on a wall of a host device using an adhesive, with a source of heat in proximity to the wall of the host device.

DETAILED DESCRIPTION

Figure 1:
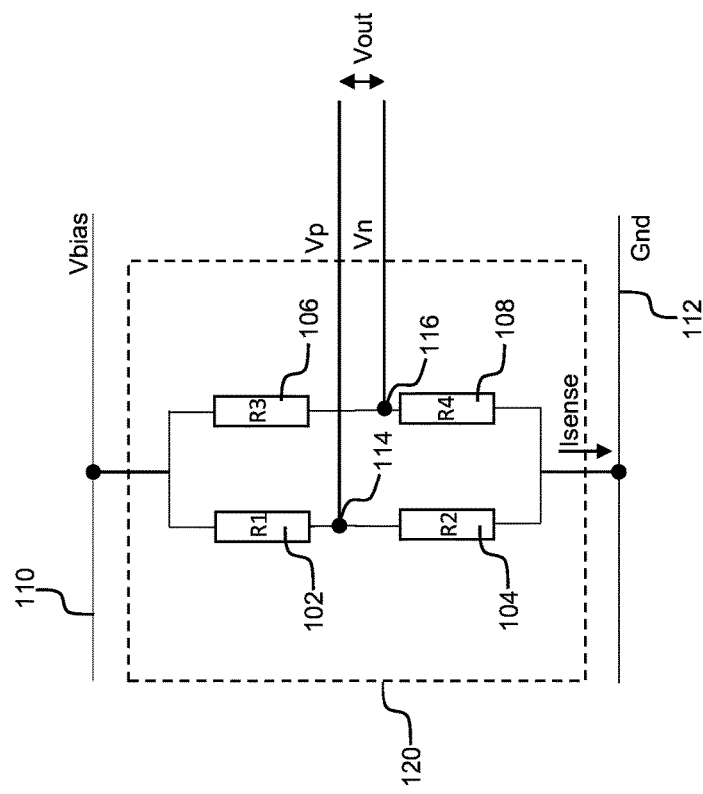
FIG. 1 is a schematic representation of a differential resistive force sensor.

Referring first to FIG. 1, a force sensor is shown generally at 100. In the illustrated example the force sensor 100 is a resistive force sensor, comprising first, second, third and fourth resistances 102, 104, 106, 108 arranged in a Wheatstone bridge configuration (shown in dashed outline at 120). Thus, the first and second resistances 102, 104 are connected in series between a first supply rail or terminal 110 that receives a bias voltage Vbias from a voltage source such as a battery (typically via a regulator such as a low dropout regulator (LDO)) and a second supply rail or terminal 112 that is coupled to a reference voltage such as ground (Gnd), forming a first resistive voltage divider that develops a first output voltage Vp at a node 114 between the series-connected first and second resistances 102, 104. Similarly, the third and fourth resistances 106, 108 are connected in series between the first supply rail or terminal 110 and the second supply rail or terminal 112, forming a second resistive voltage divider (in parallel with the first voltage divider) that develops a second output voltage Vn at a node 116 between the series-connected third and fourth resistances 106, 108.

The resistances 102, 104, 106, 108 may be selected such that a ratio of the value R1 of the first resistance 102 to the value R2 of the second resistance 104 is equal to a ratio of the value R3 of the third resistance 106 to the value R4 of the fourth resistance 108, i.e. R1:R2=R3:R4. Thus, in use of the force sensor 100, when no force is applied to the force sensor 100, the value of the first output voltage Vp is equal to the value of the second output voltage Vn, such that a differential output voltage Vout (i.e. Vp-Vn) of the force sensor 100 equals zero. When a force is applied to the force sensor 100, the resistance value R1-R4 of one or more of the resistances 102-108 changes, such that the magnitude of the first output voltage Vp differs from that of the second output voltage Vp and thus the differential output voltage Vout of the force sensor 100 takes some non-zero value, which is a function of the amount of force applied. In this way the force sensor 100 is able to output a differential sensor output voltage signal Vout that is indicative of the magnitude of a force applied to the force sensor 100.

The force sensor 100 may be configured such that when a force is applied two of the resistances (e.g. the first and fourth resistances 102, 108) are in compression, and therefore their resistance values are reduced in comparison to their resistance values when no force is applied, while the other two resistances (e.g. the second and third resistances 104, 106) are in tension, such that their resistance values are increased in comparison to their resistance values when no force is applied. In this way the differential output voltage Vout can be maximised when a force is applied to the force sensor 100, which can help to increase the likelihood of correct detection of user inputs on the force sensor 100.

The differential output voltage Vout is processed by downstream analogue or digital processing circuitry, for example to detect a user input (e.g. a press or touch on the force sensor 100) based on the differential output voltage Vout.

Force sensors of the kind described above, in which some resistances can be in compression and others can be in tension when a force is applied, are often configured as multilayer sensors in which resistances are stacked along the axis of an applied force, with a known thickness of material between the resistances. Thus, when the sensor incorporating the stack of resistances bends due to an applied force, the resistances on the inside radius of the bend are in compression whilst those on the outside radius of the bend are in tension.

For a force sensor of the kind described above and illustrated in FIG. 1 an absolute resistance value of the force sensor 100 can be defined in terms of the voltage across the force sensor and the current through the force sensor. For example, in the example force sensor 100 of FIG. 1 the absolute resistance value can be defined as:

Rabsolute=Vbias/Isense, where Vbias is the bias voltage applied to the force sensor 100 and Isense is the current through the force sensor 100.

Figure 2B:
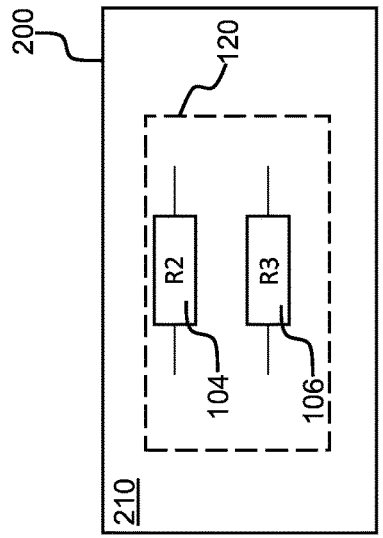
FIGS. 2a and 2b illustrate a force sensor arrangement.
Figure 2D:
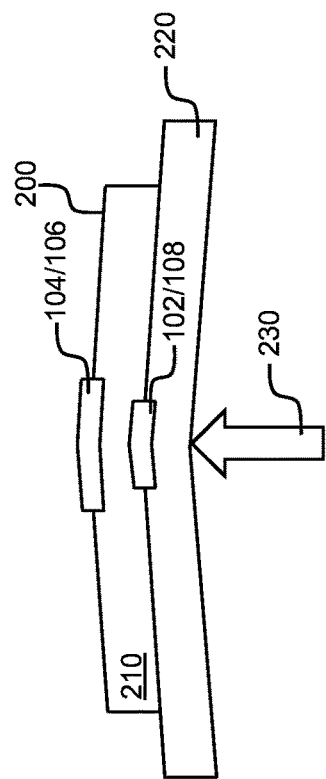
FIG. 2d illustrates the effect of an applied force on the mounted force sensor of FIG. 2c.
Figure 2A:
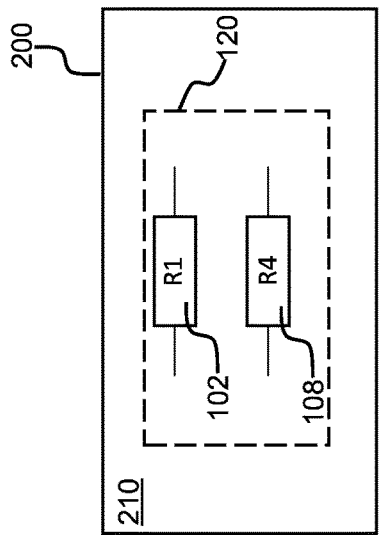

FIG. 2a schematically illustrates a front surface of a resistive force sensor 200, and shows the first and fourth resistances 102, 108 of a Wheatstone bridge 120 positioned on a front side of a sensor substrate 210. FIG. 2b schematically illustrates a back surface of the resistive force sensor 200, showing the second and third resistances 104, 106 of the Wheatstone bridge positioned on a back side of the sensor substrate 210.

Figure 2C:
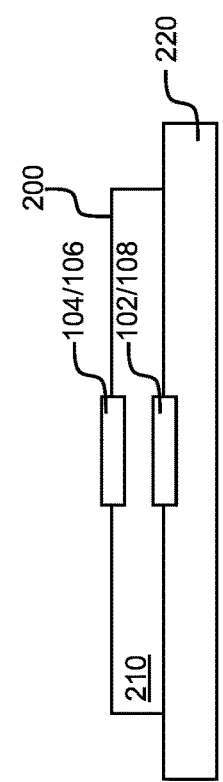
FIG. 2c illustrates a force sensor mounted on a wall of a host device.

Force sensors of the kind described above and shown in FIGS. 2a and 2b are typically mounted to an inside surface of an exterior facing wall of a host device such as a mobile phone, tablet or laptop computer or the like, such that a force applied to the wall is transmitted to the force sensor 200. Such an arrangement is illustrated in FIG. 2c, which shows a force sensor 200 mounted to a wall 220 of a host device. FIG. 2d illustrates (in exaggerated fashion) the effect of a force 230 applied to the wall 220, showing that the first and fourth resistances 102, 108 of the force sensor 200 are in compression as a result of the applied force 230, while the second and third resistances 104, 106 of the force sensor 200 are in tension as a result of the applied force 230.

The force sensor 200 may be affixed to the wall 220 of the host device using an adhesive 240, as shown in FIG. 3. Where the force sensor 200 is affixed to the wall 220 using an adhesive 240 in this way, the sensitivity of a user input transducer incorporating the force sensor 200 to an applied force may be reduced when the host device is exposed to a source of heat, which is represented in FIG. 3 by heat source 300.

The heat source 300 may be external to the host device, for example a radiator, the user's body (e.g. if the host device is stored in a user's pocket), or even the user's finger on the host device, if the user's finger is warmer than the host device (e.g. if a body or chassis of the host device is cold).

Alternatively, the heat source 300 may be internal to the host device. For example, processing circuitry and/or a battery of the host device may become hot during use of the host device, especially during extended periods of use.

When exposed to a heat source 300 (whether external or internal to the host device), the adhesive 240 may soften. As a result of this softening, the amount of force that must be applied to the wall 220 to which the force sensor 200 is attached in order to produce a given output voltage Vout may be greater than the amount of force that must be applied to the force sensor 200 to produce that output voltage in the absence of the heat source 300. Thus, the sensitivity of a user input transducer that incorporates a force sensor arrangement of the kind shown in FIG. 2c may be reduced in the presence of a heat source 300. This is undesirable, as the resulting non-uniform response of the user input transducer to user inputs may lead to a degraded user experience.

Additionally, a change in the temperature of the force sensor 200 will cause the resistance values of the constituent resistances 102-108 to change, which can give rise to a change in the sensitivity of the force sensor 200.

Figure 4:
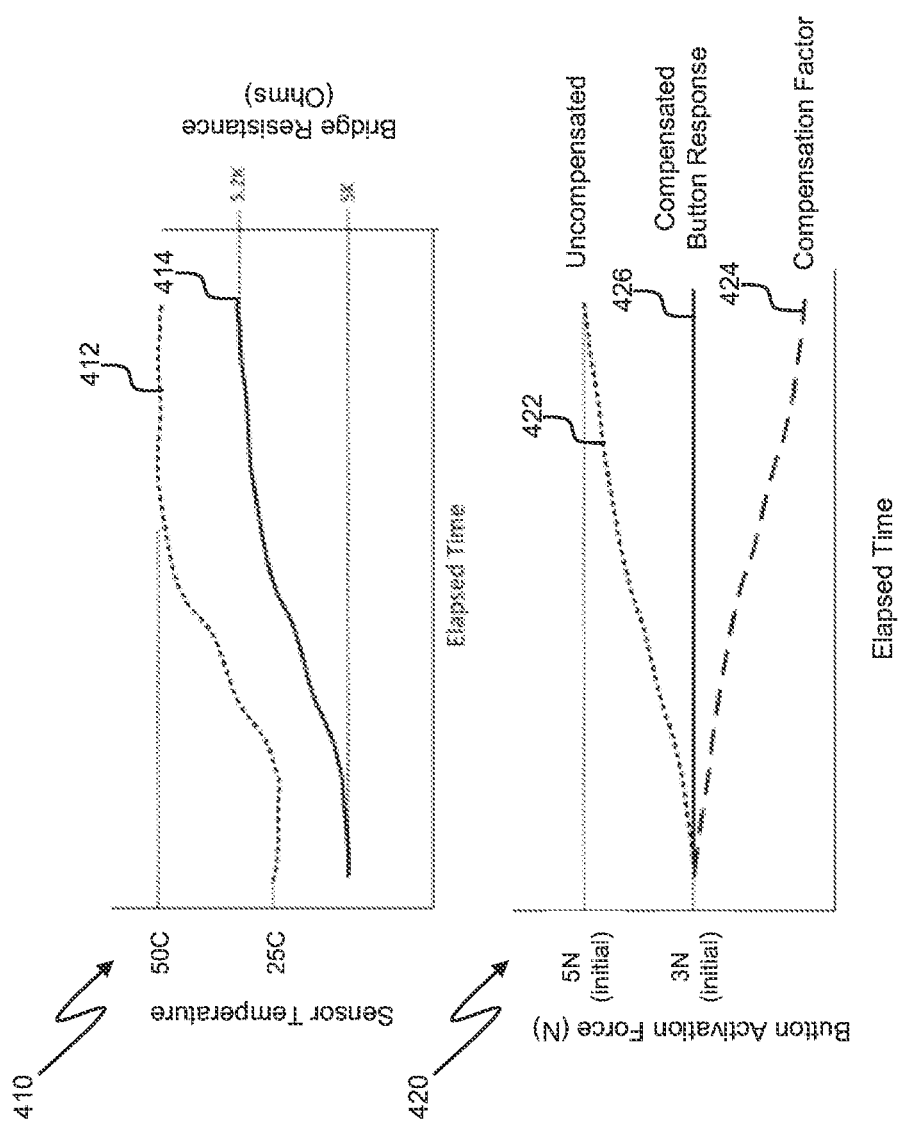
FIG. 4 illustrates the effect of temperature on an absolute resistance value of a resistive force sensor and a resulting change in force sensor sensitivity.

This latter effect is illustrated in FIG. 4, in which the uppermost graph 410 shows that an increase in the temperature of the force sensor (trace 412) leads to a corresponding increase in the absolute resistance value (trace 414) of the force sensor.

The lowermost graph of FIG. 4 illustrates the effect of the increase in the temperature of the force sensor on the applied force required to produce a given force sensor output voltage. As can be seen from trace 422, in the absence of any compensation the applied force required to produce the given force sensor output voltage increases as the temperature of the force sensor 200 increases. Trace 424 shows a compensation factor that would need to be applied to maintain a uniform response (trace 426) as the temperature of the force sensor 200 increases.

Additionally, the presence of a heat source 300 (either external to or internal to the host device) may give rise to a temperature gradient (represented in FIG. 3 by arrow 310) within the force sensor 200, which can give rise to changes in the output voltage Vout that may be incorrectly interpreted as user inputs (touches, presses or the like) on a user input transducer incorporating the force sensor 200.

For example, as shown in FIG. 2c, the first and fourth resistances 102, 108 of the force sensor 200 are positioned adjacent the wall 220 of the host device and the second and third resistances 104, 106 of the force sensor 200 are physically separated from the first and fourth resistances 102, 108 by the thickness of the force sensor substrate 210. Thus, when the host device is in the presence of the heat source 300 the temperature of the first and fourth resistances 102, 108 will be different from the temperature of the second and third resistances 104, 106 for a period of time that lasts until thermal equilibrium is reached within the force sensor 200 (i.e. until all of the resistances 102-108 are at the same temperature). During this period a temperature gradient will therefore exist within the force sensor 200, such that the heating effect of the heat source 300 will affect the resistance values of the first and fourth resistances 102, 108 more than the resistance values of the second and third resistances 104, 106.

As will be appreciated, a temperature gradient in the opposite direction may arise if the heat source is internal to the host device (e.g. if internal circuitry or an internal battery of the host device acts as a source of heat) such that the second and third resistances 104, 106 are exposed to an increased temperature before the first and fourth resistances 102, 108.

Because the output voltage Vout of the force sensor 200 varies according to the resistance values of the individual resistances 102-108 that make up the force sensor, any thermal effect that does not affect the resistances 102-108 equally could give rise to a change in the output voltage Vout that could be incorrectly interpreted as being indicative of a user input such as a touch or press on a user input transducer incorporating the force sensor 200.

Figure 5:
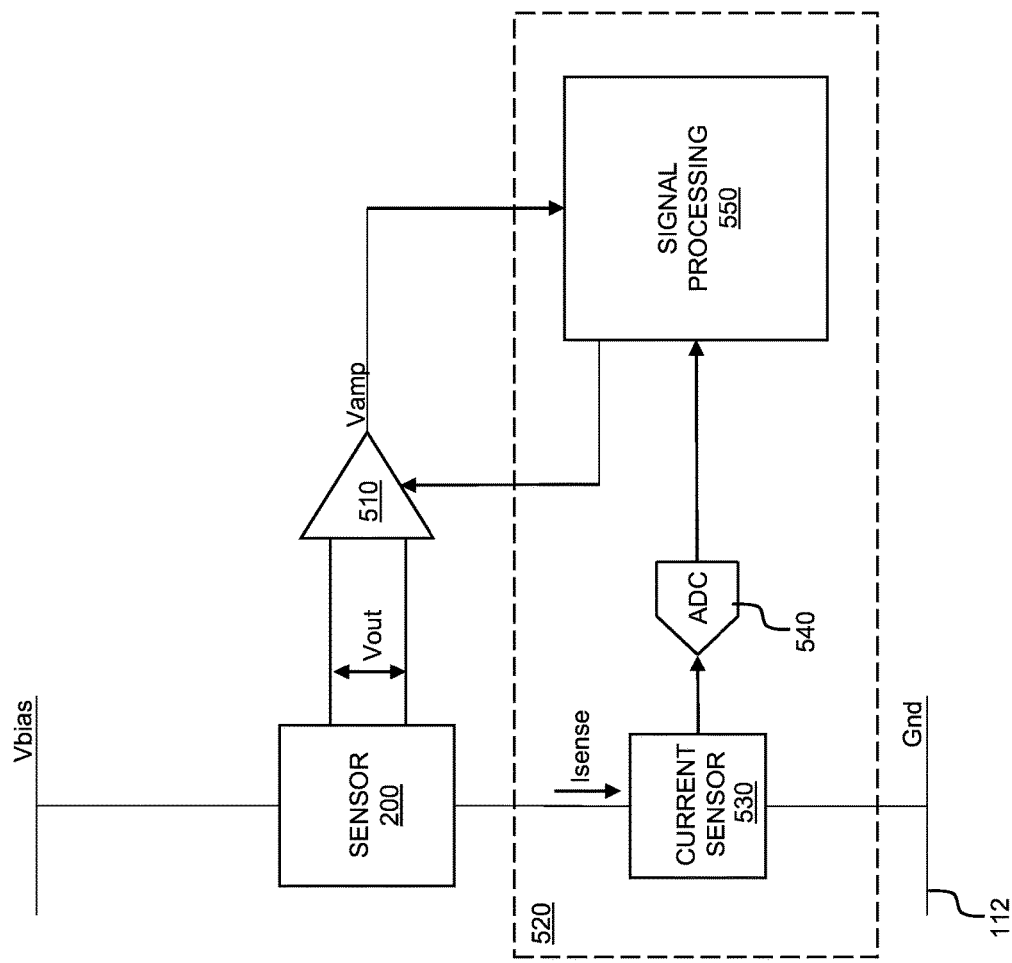
FIG. 5 is a schematic block diagram illustrating a force sensor system including a resistive force sensor and compensation circuitry for compensating for a thermal effect on the force sensor.

FIG. 5 is a schematic block diagram illustrating circuitry including compensation circuitry for processing force sensor output signals to compensate for thermal effects in the output voltage Vout output by a resistive force sensor of the kind described above.

The circuitry, shown generally at 500 in FIG. 5, includes a force sensor 200 of the kind described above, which receives a bias voltage Vbias from a first voltage rail 502. Inputs of differential amplifier circuitry 510 are coupled to differential outputs of the force sensor 200, and the differential amplifier circuitry 510 is operative to amplify the differential voltage Vout output by the force sensor 200 and to output an amplified output signal Vamp.

The circuitry 500 further includes compensation circuitry 520, which includes current sensor circuitry 530, analogue-to-digital converter (ADC) circuitry 540 and signal processing circuitry 550.

The current sensor circuitry 530 is coupled in series between the force sensor 200 and a second voltage rail 504 which supplies a reference voltage (e.g. a ground or 0 volts reference voltage) to the circuitry 500. The current sensor circuitry 530 may comprise, for example, a current sense resistor of known resistance value and associated voltage detection circuitry configured to measure a voltage drop across the current sense resistor. It is to be appreciated that although the example illustrated in FIG. 5 performs low-side current sensing, other examples could perform high-side current sensing as will be understood and appreciated by persons skilled in the art.

The current sensor circuitry 530 is configured to output a current sense signal, indicative of a current Isense through the force sensor 200, to the ADC circuitry 540. The ADC circuitry 540 in turn converts the current sense signal into a digital signal indicative of the current Isense, and outputs this digital signal to the signal processing circuitry 550, for use in compensating for a change in sensor sensitivity and/or error in the differential voltage Vout output by the force sensor 200 as a result of thermal effects on the force sensor 200, as will be described in detail below.

It will be understood that the ADC circuitry 540 may be omitted if the current sensor circuitry 530 includes its own ADC circuitry and is thus configured to output a digital signal indicative of the current Isense. Alternatively the ADC circuitry 540 may also be omitted if the signal processing circuitry 550 is analogue signal processing circuitry.

The signal processing circuitry 550, which (as indicated above) may be analogue signal processing circuitry or may be digital signal processing circuitry or a combination of both, is configured to monitor the output of the amplifier circuitry 510 to determine whether a valid user input such as a press, touch or the like has been received by the force sensor 200.

To this end the signal processing circuitry 550 may be configured to sample the signal output by the amplifier circuitry 510 at a predetermined sampling frequency, and to determine, based on the values of the samples, whether a valid user input has been received by the force sensor 200. For example, the signal processing circuitry 550 may be configured to compare each sample value to a predetermined threshold value, or to one or more values of one or more predetermined signatures for valid user inputs, in order to determine whether the sample values correspond to sample values for a valid user input.

If the signal processing circuitry 550 determines that a valid user input has been received by the force sensor 200 it may output a signal indicative of a valid user input to, e.g., downstream processing circuitry of a host device, which may take appropriate action in response to the detection of the valid user input.

As described above, thermal effects can adversely impact the sensitivity of a user input transducer that incorporates the force sensor 200. The signal processing circuitry 550 is configured to compensate for such thermal effects, in order to compensate for changes in the sensitivity of the user input transducer and/or to reduce the risk of false detection of user inputs on the user input transducer.

By determining the current absolute resistance value of the force sensor 200 and comparing the current absolute resistance value to a known or predetermined initial absolute resistance value for the force sensor (e.g. a value determined during an initial calibration of the circuitry 500), the signal processing circuitry 550 can determine a compensation factor to apply before or during processing of the sensor output signal to compensate for changes in the sensitivity of the user input transducer.

Additionally, the signal processing circuitry 550 can use the determined current absolute resistance value in combination with the output voltage Vout of the force sensor 200 to determine whether a change in the output voltage Vout is due to a valid user input or has arisen as a result of a temperature gradient in the force sensor 200, and can alter a mechanism used for detection of a valid user input accordingly, so as to reduce the risk of false positive detection of user inputs.

Figure 6:
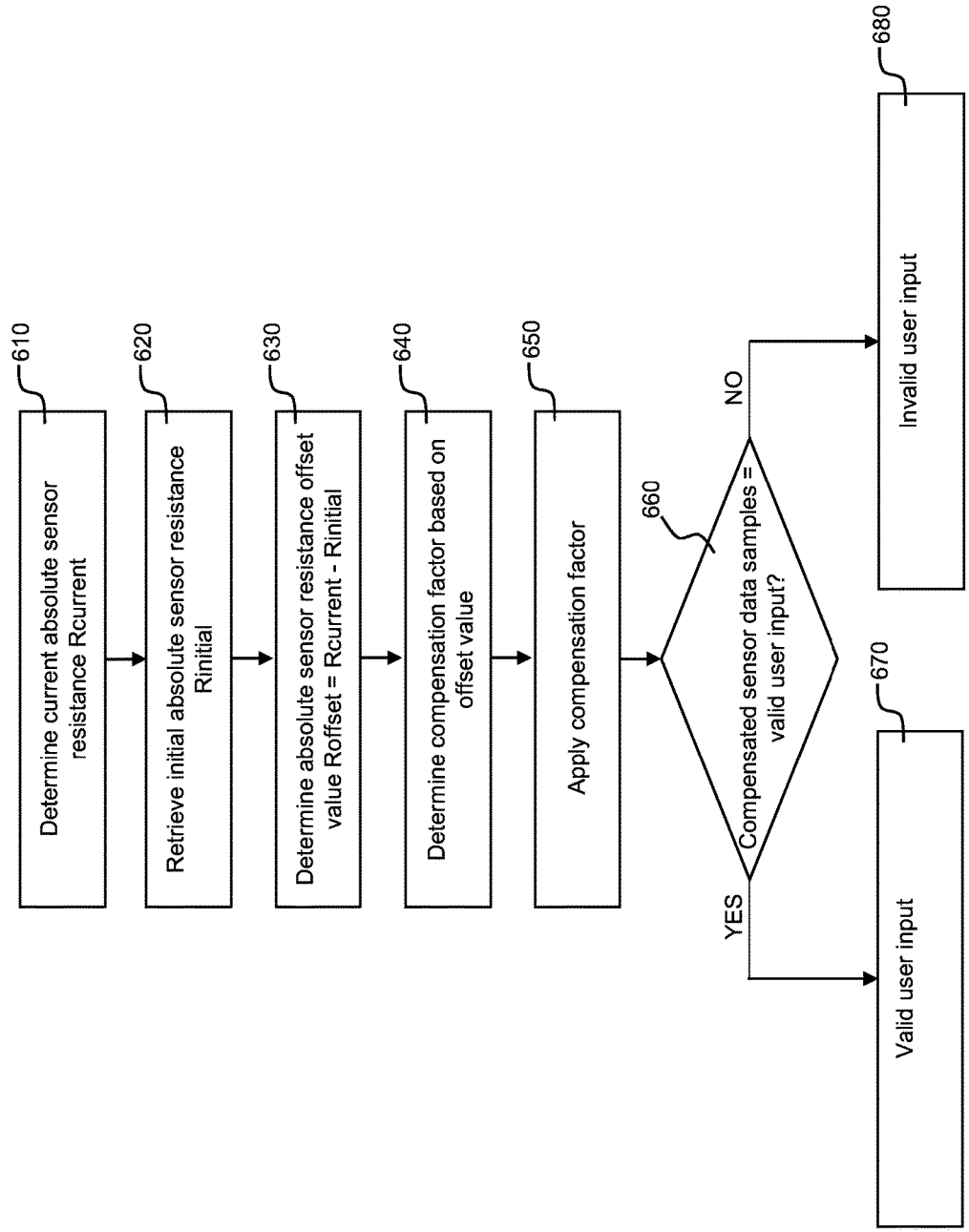
FIG. 6 is a flow diagram illustrating operations performed by processing circuitry to process signals output by a force sensor to compensate for a change in force sensor sensitivity arising as a result of a temperature change.

FIG. 6 is a flow diagram illustrating operations performed by the signal processing circuitry 550 to compensate for changes in the sensitivity of the user input transducer that may arise as a result of thermal effects on the force sensor 200.

The signal processing circuitry 550 is configured to determine a current absolute resistance value of the force sensor 200 based on the known bias voltage Vbias and the current Isense through the force sensor 200, as determined by the current sensor circuitry 530 at a particular sampling instant or over a particular sampling period. Thus the signal processing circuitry 550 determines (operation 610) the current absolute resistance value Rcurrent of the force sensor 200 according to the calculation:

Rcurrent=Vbias/Isense.

At operation 620 the signal processing circuitry 550 retrieves an initial absolute sensor resistance Rinitial. The initial absolute sensor resistance Rinitial may be, for example, a calibration value of the absolute resistance of the sensor 200 determined by the signal processing circuitry 550 with the force sensor 200 at a known temperature and stored in a memory, register or the like that is associated with the signal processing circuitry 550.

At operation 630 the signal processing circuitry 550 determines an absolute sensor resistance offset value Roffset, by subtracting the determined current absolute sensor resistance Rcurrent from the initial absolute sensor resistance Rinitial, i.e.:

Roffset=Rcurrent−Rinitial.

At operation 640 the signal processing circuitry 550 determines a compensation factor based on the determined offset value Roffset. The compensation factor is applied (operation 650) by the signal processing circuitry 550 in order to compensate for thermal effects on the output Vout of the force sensor 200.

The compensation factor may be an analogue gain compensation factor applied to the amplifier circuitry 510 to adjust the gain of the amplifier circuitry 510, so as to "normalise" the signal output by the amplifier circuitry 510, thereby compensating, at least partially, for the thermal effects on the output Vout of the force sensor 200.

Additionally or alternatively, the compensation factor may alter one or more other parameters such as a digital gain, time constant, one or more user input signal validity thresholds, one or more filter coefficients, a cutoff frequency or the like that may be used in the processing of the sensor output signal Vout by the signal processing circuitry 550 and/or the amplifier circuitry 510 to the output signal Vout and/or to samples of the output signal Vout.

Further, the compensation factor may additionally or alternatively be used to adjust an operating point (e.g. a bias voltage or bias current) of the force sensor 200 to compensate, at least partially, for the thermal effects on the output Vout of the force sensor.

At operation 650 the signal processing circuitry 550 determines whether the compensated or normalised output signal (e.g. sample values to which compensation has been applied, either by the amplifier circuitry 510 or by the signal processing circuitry 550 as described above), correspond to a valid user input. For example, the signal processing circuitry 550 may compare compensated sample values to values of known signature for a valid user input to determine whether they correspond to a valid user input. Alternatively, the signal processing circuitry 550 may compare compensated sample values to a threshold to determine whether they correspond to a valid user input.

If the signal processing circuitry 550 determines that the compensated sample values correspond to a valid user input, an output signal indicative of detection of a valid user input is output by the signal processing circuitry 550 to downstream processing circuitry at operation 670.

Otherwise no output signal is output by the signal processing circuitry 550, or alternatively an output signal indicative that no valid user input has been detected may be output by the signal processing circuitry 550 to the downstream processing circuitry at operation 680.

Thus, the signal processing circuitry 550 is able to compensate for changes in sensitivity that may arise due to thermal effects on the force sensor 200.

The signal processing circuitry 550 is also able to compensate for errors that may arise as a result of a thermal gradient in the force sensor 200, as will now be described with reference to FIGS. 7-9.

Figure 7:
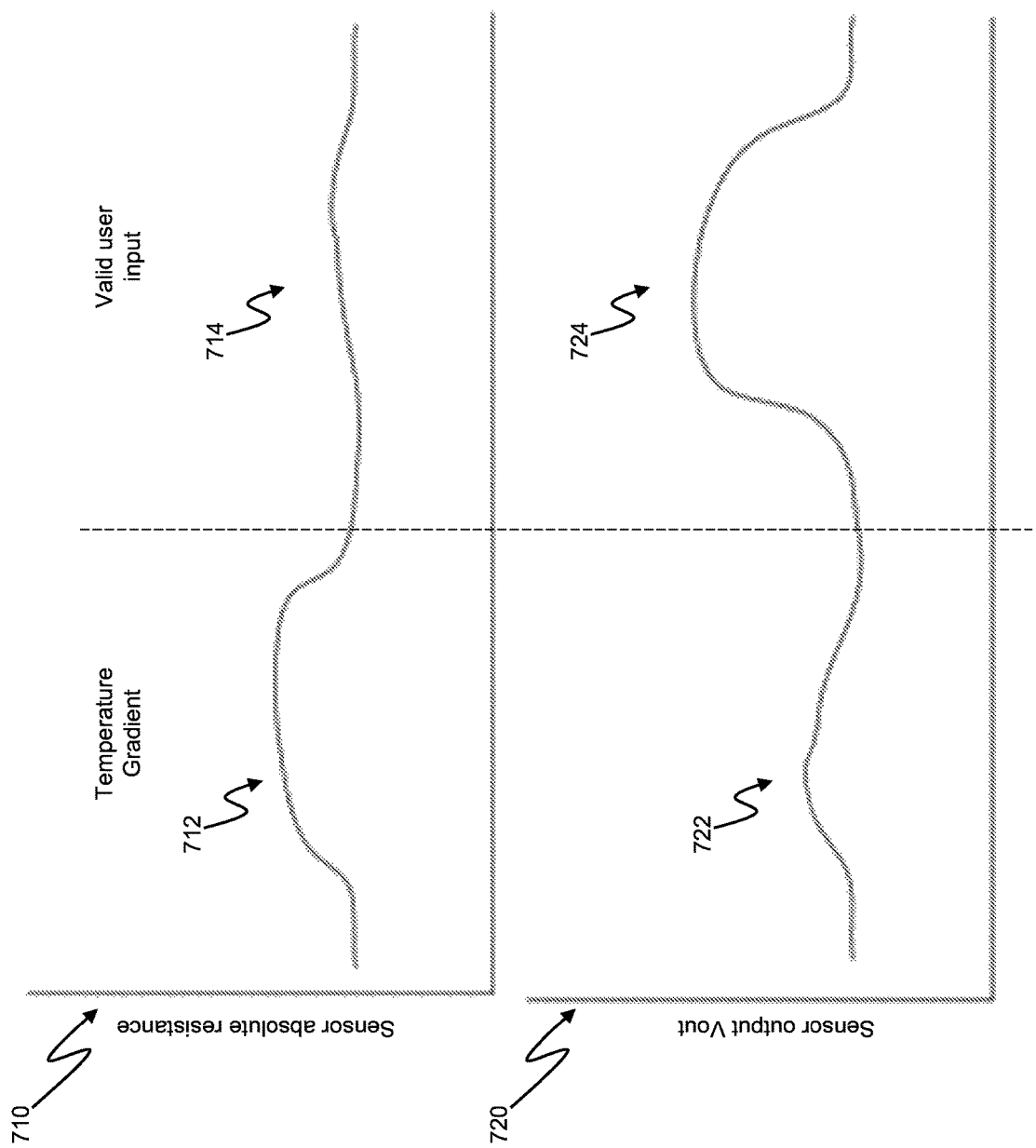
FIG. 7 illustrates a difference between the absolute resistance value of a force sensor in the presence of a temperature gradient and in the presence of a valid user input, and a difference between a differential output voltage of a force sensor in the presence of a temperature gradient and in the presence of a valid user input.

FIG. 7 illustrates (in the uppermost graph 710) the difference between a change in the absolute resistance value of the force sensor 200 that arises as a result of a temperature gradient in the force sensor 200 and a change in the absolute resistance value of the force sensor 200 that arises as a result of a valid user input. FIG. 7 also illustrates (in the lowermost graph 720) the difference between a change in the output voltage Vout of the force sensor 200 that arises as a result of a temperature gradient in the force sensor 200 and a change in the output voltage Vout of the force sensor 200 that arises as a result of a valid user input.

As can be seen from portion 712 of the graph 710, an effect of a temperature gradient in the force sensor 200 is a relatively large increase in the absolute resistance value of the force sensor 200. This is because the resistance values of all of the constituent resistances 102-108 of the force sensor 200 all change in the same way as a result of the change in the temperature of the force sensor. Thus, in the presence of a heat source (e.g. heat source 300) the resistance values of all of the resistances 102-108 will all increase (albeit to a different extent, due to the thermal gradient in the force sensor 200), leading to the relatively large increase in the absolute resistance value of the force sensor 200.

In contrast, as can be seen from portion 714 of the graph 710, when the force sensor 200 is subjected to a valid user input such as a press or touch, the change in the absolute resistance value of the force sensor 200 is less than the change that arises due to a temperature gradient in the force sensor 200. This is because the effect on the absolute resistance value of the force sensor 200 of the increase in the resistance values of the resistances 104, 106 that are in tension as a result of the applied force exerted by the user is at least partially cancelled out by the reduction in the resistance values of the resistances 102, 108 that are in compression as a result of the applied force.

Another effect of a temperature gradient in the force sensor 200 is a relatively small increase in the differential output voltage Vout of the force sensor 200, as can be seen from portion 722 of the graph 720. Again, this is because the resistance values of all of the constituent resistances 102-108 of the force sensor all change in the same way as a result of the change in the temperature of the force sensor. Thus, in the presence of a heat source (e.g. heat source 300) the resistance values of all of the resistances 102-108 will all increase (albeit to a different extent, due to the thermal gradient in the force sensor 200), which leads to a relatively small difference between the voltage Vp that develops at the node 114 and the voltage Vn that develops at the node 116 and hence to a relatively small change in the differential output voltage Vout of the force sensor 200.

In contrast, as shown in portion 724 of the graph 720, when the force sensor 200 is subjected to a valid user input such as a press or touch, the change in the differential output voltage Vout of the force sensor 200 is much greater than the change that arises due to a temperature gradient in the force sensor 200. This is because the output voltages Vp and Vn move in different directions (e.g. Vp increases and Vn decreases, or vice versa) due to the increase in the resistance values of the resistances 104, 106 that are in tension as a result of the applied force exerted by the user and the reduction in the resistance values of the resistances 102, 108 that are in compression as a result of the applied force. As a result, a relatively large change in the differential output voltage Vout of the force sensor 200 occurs when the force sensor 200 is subjected to a valid user input.

By monitoring the absolute resistance value of the force sensor 200 and the differential output voltage Vout of the force sensor 200, the signal processing circuitry 550 is able to distinguish between the effects of a thermal gradient in the force sensor 200 and those of a valid user input on the force sensor 200, and is thus able to reduce the likelihood of false user input detection, as will now be described with reference to FIGS. 8 and 9.

Figure 8:
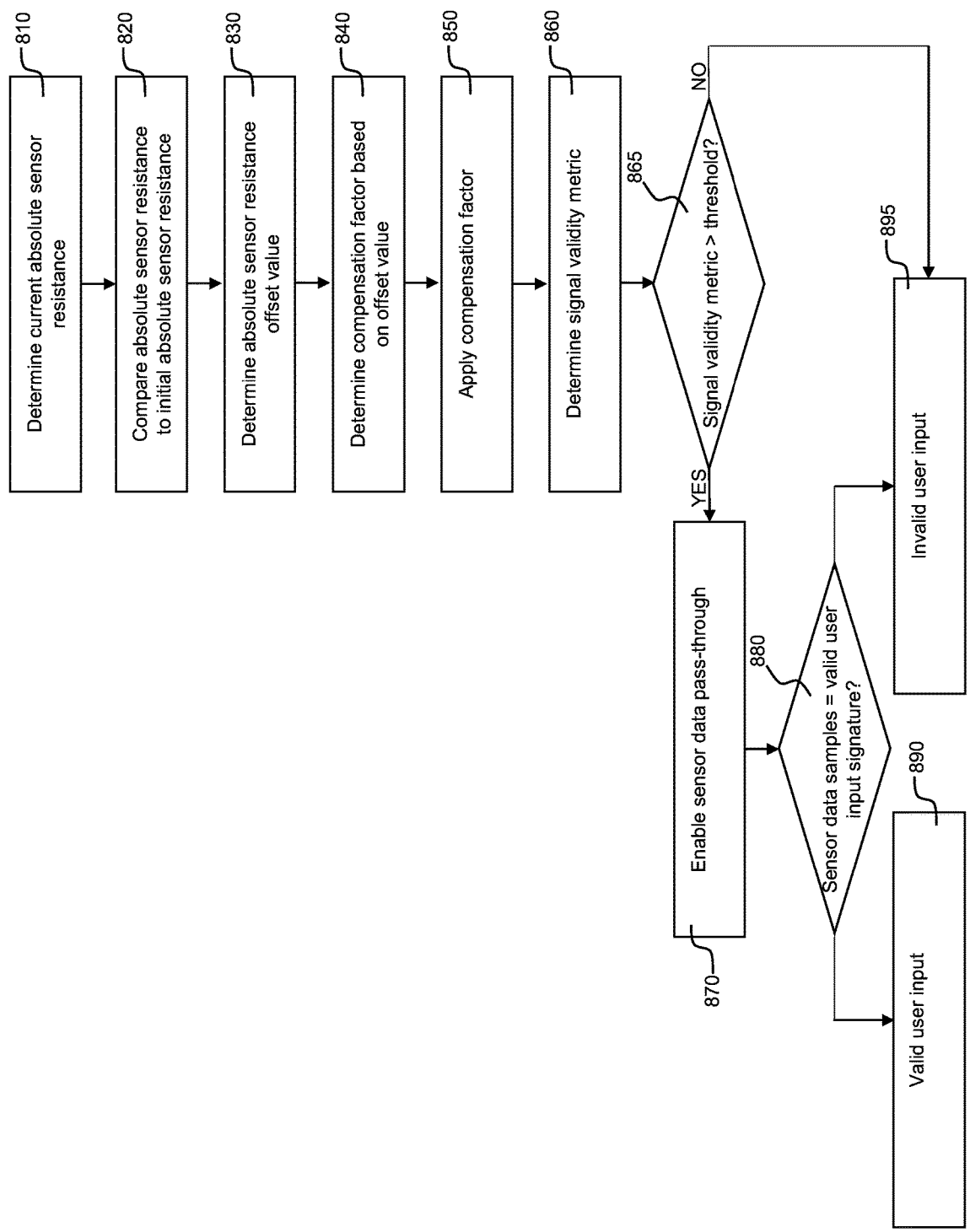
FIG. 8 is a flow diagram illustrating operations performed by processing circuitry to process signals output by a force sensor to compensate for effects of a temperature gradient in the force sensor.
Figure 9:
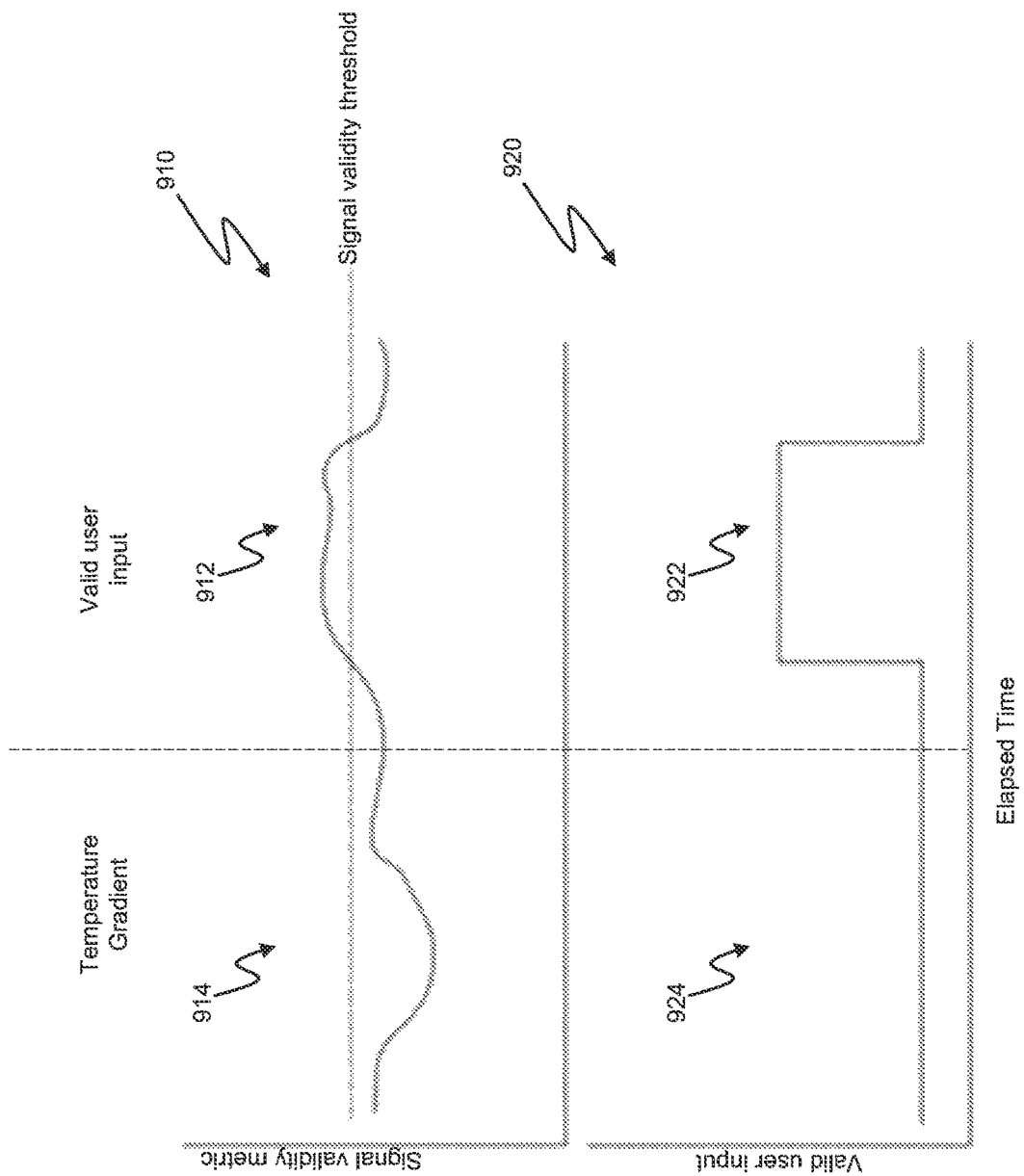
FIG. 9 graphically illustrates the effect of some of the operations performed by the processing circuitry.

FIG. 8 is a flow diagram illustrating operations performed by the signal processing circuitry 550 to compensate for the effect of a thermal gradient in the force sensor 200 in order to reduce the risk of false user input detection, whilst FIG. 9 graphically illustrates the effect of some of the operations performed by the signal processing circuitry 550.

Operations 810-830, at lead to the determination of an absolute sensor resistance offset value Roffset are similar to the corresponding operations 610-630 of FIG. 6 and thus will not be described again in detail here.

At operation 840 the signal processing circuitry determines a thermal gradient compensation factor to be applied to the determined current absolute resistance value Rcurrent of the force sensor 200. The thermal gradient compensation factor may be, for example, a scaling factor to be applied to Rcurrent.

At operation 850 the thermal gradient compensation factor is applied by the signal processing circuitry 550 to the determined current absolute resistance value Rcurrent to generate a compensated absolute resistance value Rcomp. The compensated absolute resistance value Rcomp (or a signal indicative thereof) may be subjected to processing in a manner that will be familiar to those of ordinary skill in the art. For example, one or more gains and/or one or more time constants and/or one or more thresholds may be applied.

At operation 860 the signal processing circuitry 550 determines a signal validity metric, based upon the compensated absolute sensor resistance value Rcomp and the sensor output voltage Vout. For example, the signal validity metric ValidSignal may be determined by a simple subtraction of a sensor output voltage Vout value from the corresponding compensated absolute sensor resistance value Rcomp, i.e.:

ValidSignal=RComp−Vout.

Thus the signal validity metric takes into account both the absolute resistance value of the force sensor 200 and the differential output voltage Vout of the force sensor 200, and can thus be used to distinguish between a valid user input and an effect arising as a result of a thermal gradient in the force sensor 200. As will be appreciated by those of ordinary skill in the art, the signal validity metric may be calculated in any other way which takes into account both the absolute resistance value of the force sensor 200 and the differential output voltage Vout of the force sensor 200. Further, the compensated absolute sensor resistance value Rcomp (or a signal representative thereof) may be subject to independent filtering to remove noise or to better determine resistance signatures before the signal validity metric is calculated.

At operation 865, the signal validity metric is compared to a predetermined signal validity threshold in order to determine whether the absolute resistance value of the force sensor and the output voltage Vout of the force sensor correspond to a valid user input or to the effects of a thermal gradient in the force sensor 200.

If the signal validity metric exceeds the signal validity threshold, as shown in portion 912 of the graph 910 of FIG. 9, the signal processing circuitry 550 determines that the detected changes did not arise as a result of a thermal gradient and thus enables pass-through of the sensor differential output voltage Vout data, i.e. the sampled values of the sensor differential output voltage Vout (at operation 870) for further processing, to determine whether a valid user input has been received.

If so, processing moves to operation 880, which is similar to operation 650 described above, in which the signal processing circuitry 550 determines whether the sample values (to which compensation may have been applied, either by the amplifier circuitry 510 or by the signal processing circuitry 550 as described above), correspond to a valid user input. If so, an output signal indicative of detection of a valid user input is output by the signal processing circuitry 550 to downstream processing circuitry at operation 890 (as shown in portion 922 of the graph 920 of FIG. 9). Otherwise no output signal is output by the signal processing circuitry 550 (as shown in portion 924 of the graph 920 of FIG. 9), or alternatively an output signal indicative that no valid user input has been detected may be output by the signal processing circuitry 550 to the downstream processing circuitry at operation 895.

If, at operation 865, the signal processing circuitry 550 determines that the signal validity metric does not exceed the signal validity threshold, as shown in portion 914 of the graph 900 of FIG. 9, the signal processing circuitry 550 determines that the detected changes arose as a result of a thermal gradient and thus processing moves to operation 895, since no valid user input could be detected.

Figure 10:
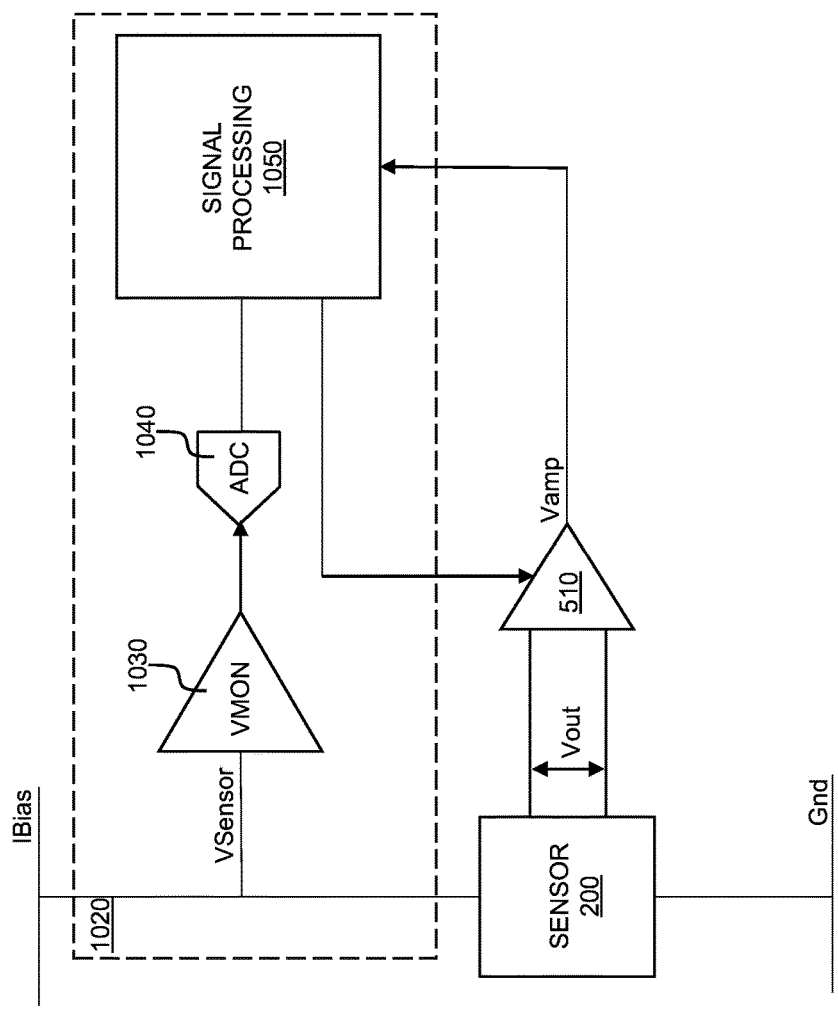
FIG. 10 is a schematic diagram illustrating a force sensor system including a resistive force sensor and alternative compensation circuitry for compensating for a thermal effect on the force sensor.

FIG. 10 is a schematic block diagram illustrating circuitry including alternative compensation circuitry for processing force sensor output signals to compensate for thermal effects in the output voltage Vout output by a resistive force sensor of the kind described above.

The circuitry, shown generally at 1000 in FIG. 10, includes a force sensor 200 of the kind described above, which receives a known bias current Ibias. Inputs of differential amplifier circuitry 510 are coupled to differential outputs of the force sensor 200, and the differential amplifier circuitry 510 is operative to amplify the differential voltage Vout output by the force sensor 200 and to output an amplified output signal.

The circuitry 1000 further includes compensation circuitry 1020, which includes voltage monitoring circuitry 1030, analogue-to-digital converter (ADC) circuitry 1040 and signal processing circuitry 1050.

The voltage monitoring circuitry 1030 (which in the illustrated example performs high-side voltage detection, but which could equally be configured to perform low-side voltage detection), is configured to output a voltage sense signal, indicative of a voltage VSensor across through the force sensor 200, to the ADC circuitry 1040. The ADC circuitry 1040 in turn converts the voltage sense signal into a digital signal indicative of the voltage VSensor, and outputs this digital signal to the signal processing circuitry 1050.

As will be understood by those of ordinary skill in the art, the ADC circuitry 1040 may be omitted if the voltage sensor circuitry 1030 includes its own ADC circuitry and is thus configured to output a digital signal indicative of the voltage across the force sensor 200. The ADC circuitry 1040 may also be omitted if the signal processing circuitry 1050 is analogue signal processing circuitry.

The signal processing circuitry 1050, which (as indicated above) may be analogue signal processing circuitry or alternatively may be digital signal processing circuitry, is configured to monitor the output of the amplifier circuitry 510 to determine whether a valid user input such as a press, touch or the like has been received by the force sensor 200. The signal processing circuitry 1050 is operative generally in the manner described above with reference to FIGS. 6-9, with the exception that the bias current Ibias is known and the voltage VSensor across the force sensor is measured. Thus in operations 610 and 810 the absolute resistance of the force sensor 200 is calculated by the signal processing circuitry 1050 according to the calculation:

Rabsolute=Vsensor/Ibias.

All of the other operations performed by the signal processing circuitry to compensate for altered sensitivity arising from thermal effects on the force sensor 200 and/or to reduce the likelihood of false positives in detection of user inputs as a result of a thermal gradient in the force sensor 200 are as described above with respect to FIGS. 6-9.

Figure 11:
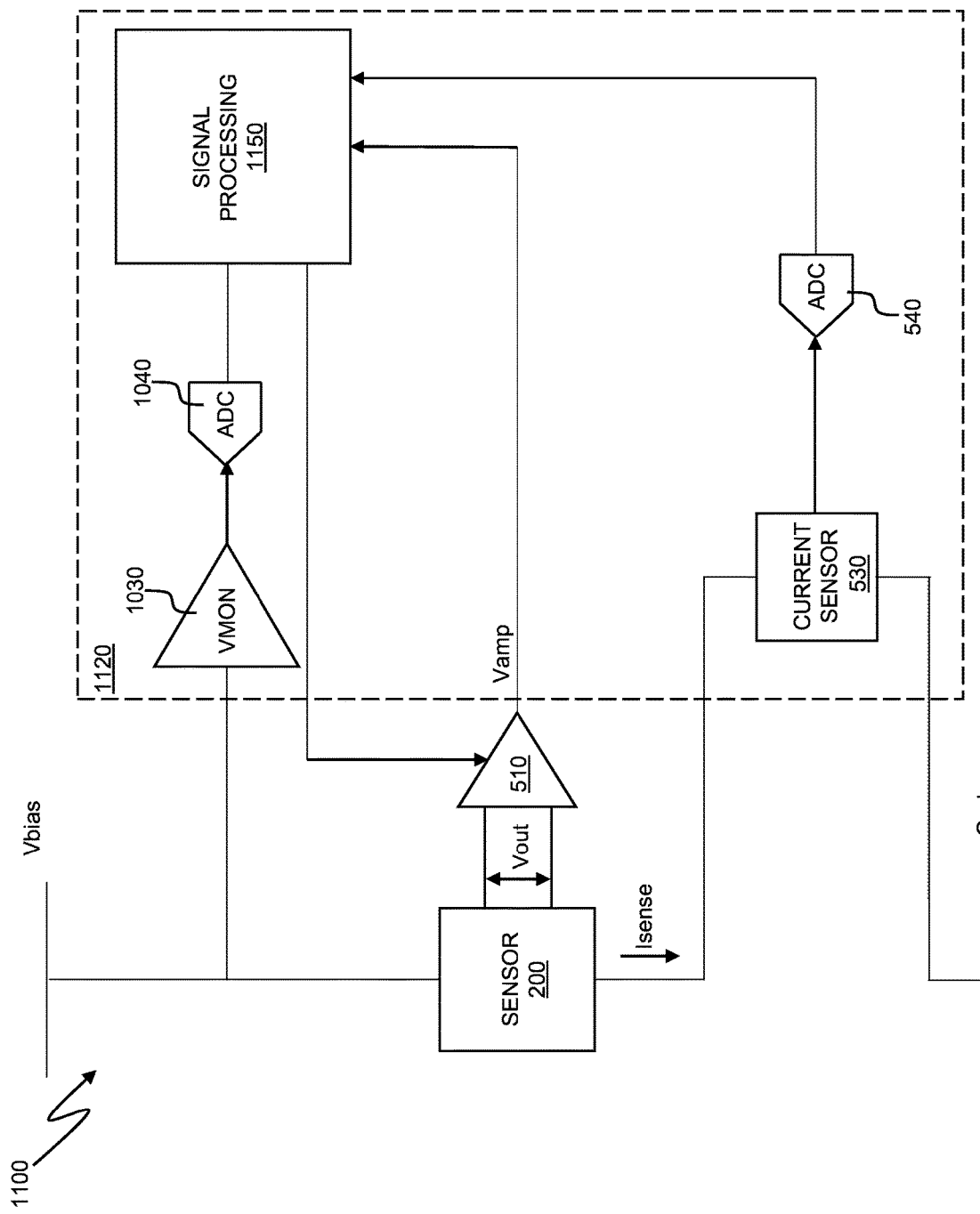
FIG. 11 is a schematic diagram illustrating a force sensor system including a resistive force sensor and further alternative compensation circuitry for compensating for a thermal effect on the force sensor.

FIG. 11 is a schematic block diagram illustrating circuitry including further alternative compensation circuitry for processing force sensor output signals to compensate for thermal effects in the output voltage Vout output by a resistive force sensor of the kind described above.

The circuitry, shown generally at 1100 in FIG. 11, includes a force sensor 200 of the kind described above, which receives a bias voltage Vbias. Inputs of differential amplifier circuitry 510 are coupled to differential outputs of the force sensor 200, and the differential amplifier circuitry 510 is operative to amplify the differential voltage Vout output by the force sensor 200 and to output an amplified output signal.

The circuitry 1100 further includes compensation circuitry 1120, which includes voltage monitoring circuitry 1030, analogue-to-digital converter (ADC) circuitry 1040 and signal processing circuitry 1150 of the kind described above with reference to FIG. 10, and current sensor circuitry 530 and ADC circuitry 540 of the kind described above with reference to FIG. 5.

The voltage monitoring circuitry 1030 is configured to output a voltage sense signal, indicative of a voltage VSensor across the force sensor 200, to the ADC circuitry 1040. The ADC circuitry 1040 in turn converts the voltage sense signal into a digital signal indicative of the voltage VSensor, and outputs this digital signal to the signal processing circuitry 1150.

The ADC circuitry 1040 may be omitted if the voltage sensor circuitry 1030 includes its own ADC circuitry and is thus configured to output a digital signal indicative of the voltage across the force sensor 200. Alternatively, the ADC circuitry 1040 may also be omitted if the signal processing circuitry 1150 is analogue signal processing circuitry.

The current sensor circuitry 530 is configured to output a current sense signal, indicative of a current Isense through the force sensor 200, to the ADC circuitry 540. The ADC circuitry 540 in turn converts the current sense signal into a digital signal indicative of the current Isense, and outputs this digital signal to the signal processing circuitry 1150.

The ADC circuitry 540 may be omitted if the current sensor circuitry 530 includes its own ADC circuitry and is thus configured to output a digital signal indicative of the current Isense. Alternatively, the ADC circuitry 540 may also be omitted if the signal processing circuitry 1150 is analogue signal processing circuitry.

The example illustrated in FIG. 11 includes high-side voltage monitoring circuitry and low-side current monitoring circuitry, but it will be appreciated by those of ordinary skill in that art that other examples could include high-side current monitoring circuitry and low-side voltage monitoring circuitry, or high-side or low-side voltage and current monitoring circuitry.

The signal processing circuitry 1150, which (as indicated above) may be analogue signal processing circuitry or alternatively may be digital signal processing circuitry, is configured to monitor the output of the amplifier circuitry 510 to determine whether a valid user input such as a press, touch or the like has been received by the force sensor 200. The signal processing circuitry 1150 is operative generally in the manner described above, with the exception that both the current Isense through the force sensor 200 and the voltage VSensor across the force sensor are measured. Thus in operations 610 and 810 the absolute resistance of the force sensor 200 is calculated by the signal processing circuitry 1150 according to the calculation:

Rabsolute=−Vsensor/Isense.

All of the other operations performed by the signal processing circuitry to compensate for altered sensitivity arising from thermal effects on the force sensor 200 and/or to reduce the likelihood of false positives in detection of user inputs as a result of a thermal gradient in the force sensor 200 are as described above with respect to FIGS. 6-9.

The discussion above describes dynamically compensating for thermal effects on the force sensor 200, but it is to be appreciated that the above-described techniques can also be performed during an initial calibration of a system incorporating the force sensor 200 and the circuitry 500, 1000, 1100, and that such a system can be re-calibrated using the above-described techniques occasionally or periodically thereafter.

The compensation techniques described above can be triggered in response to a number of conditions, for example: if a measured or determined value of the absolute resistance of the force sensor 200 exceeds a predetermined threshold; if a relative change in the absolute resistance of the force sensor 200 differs from a target change over time; based on a comparison of the absolute resistance of the force sensor 200 to the differential output voltage Vout of the force sensor 200; a comparison of the absolute resistance of multiple different force sensors; or a combination of any two or more of the above factors.

To improve further the performance of a system incorporating a force sensor and compensation circuitry as described above, an improved force sensor may be employed.

As described above with reference to FIG. 1, a resistive force sensor comprises first, second, third and fourth resistances 102, 104, 106, 108 arranged in a Wheatstone bridge configuration. In an improved force sensor according to the present disclosure the Wheatstone bridge may be designed such that the bending stress that arises when a force is applied to the force sensor (e.g. by a user pressing the force sensor or a wall of a host device two which the force sensor is mounted) results in a change in the resistance values of the resistances 102, 108 that are in compression that is equal and opposite to a change in the resistance value of the resistances 104, 106 that are in tension.

In such an arrangement there will be no change in the absolute resistance of the force sensor when a force is applied, and thus any change in the absolute resistance of the force sensor will arise only as a result of a change in the temperature of the force sensor. Thus, such an arrangement can improve detection of temperature changes that may affect the force sensor. Such an arrangement can also improve detection of temperature gradients in the force sensor, since any change in the output voltage in combination with a change in the absolute resistance of the force sensor must be due to a temperature gradient.

Various properties of the resistances 102-104 can be adjusted in order to achieve this effect. For example, the shape of each of the resistances 102-104 can be selected such that the bending stress that arises when a force is applied to the force sensor results in a change in the resistance values of the resistances 102, 108 that are in compression that is equal and opposite to a change in the resistance value of the resistances 104, 106 that are in tension. Additionally, or alternatively, the size of each of the resistances 102-108 can be selected to achieve this effect. Further, the resistivity or resistance value of each of the resistances 102-108 can be selected to achieve this effect. Any single property, or any combination of these properties, of the resistances 102-108 may be selected or adjusted to achieve the desired effect.

The compensation circuitry described above with reference to FIGS. 5-11 may be provided as a standalone module or circuitry that can be coupled to force sensor circuitry. Alternatively, the compensation circuitry or module may be provided in a package with force sensor circuitry. For example, the compensation circuitry may be mounted on a common substrate (e.g. a printed circuit board or the like) with a force sensor, thus forming a combined force sensor/compensation circuit or module. As a further alternative, the compensation circuitry or module and/or the force sensor circuitry may be provided in a package with force sense signal acquisition and/or processing circuitry.

The compensation circuitry (whether provided as a stand-alone module or packaged in combination with a force sensor) may be provided as part of a device that uses one or more force sensors as user input transducers, for example a portable device such as a mobile telephone, tablet or laptop computer, portable media player, in-vehicle entertainment system, a gaming device or controller or the like. Such devices are typically battery-powered.

As will be appreciated from the foregoing discussion, the present disclosure provides an effective mechanism for compensating for thermal effects in the output of a force sensor, thus enabling accurate detection of a desired sense signal in the force sensor output.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. Compensation circuitry for compensating for a thermal effect on a resistive force sensor in a force sensor system, the compensation circuitry comprising:
   monitoring circuitry configured to monitor a voltage across the resistive force sensor and a current through the resistive force sensor; and
   processing circuitry, wherein the processing circuitry is configured to:
   determine an absolute resistance value for the force sensor based on the monitored voltage across the force sensor and the monitored current through the force sensor; and
   adjust one or more operational parameters of the force sensor system based at least in part on the determined absolute resistance value.

2. Compensation circuitry according to claim 1, wherein the processing circuitry is configured to determine a compensation factor based on an offset value between the determined absolute resistance value and an initial absolute resistance value for the force sensor.

3. Compensation circuitry according to claim 2, wherein the processing circuitry is further configured to apply the compensation factor to adjust the one or more operational parameters of the force sensor system so as to generate a compensated force sensor output signal.

4. Compensation circuitry according to claim 3, wherein the processing circuitry is further configured to process the compensated force sensor output signal to determine whether the compensated force sensor output signal corresponds to a valid user input.

5. Compensation circuitry according to claim 4, wherein the processing circuitry is configured to compare the compensated force sensor output signal to a threshold or to a known signature for a valid user input to determine whether the compensated force sensor output signal corresponds to a valid user input.

6. Compensation circuitry according to claim 1, wherein the one or more operational parameters comprise one or more of:

an analogue gain;
a digital gain;
a time constant;
a user input signal validity threshold;
a filter coefficient;
a cutoff frequency;
an operating point of the force sensor;
a bias voltage of the force sensor; and
a bias current of the force sensor.

7. Compensation circuitry according to claim 1, wherein the processing circuitry is further configured to:
   monitor an output voltage of the force sensor; and
   adjust the one or more operational parameters of the force sensor system based on the determined absolute resistance value and the monitored output voltage.

8. Compensation circuitry according to claim 7, wherein the processing circuitry is configured to determine a thermal gradient compensation factor based on an offset value between the determined absolute resistance value and an initial absolute resistance value for the force sensor, wherein the thermal gradient compensation factor comprises a scaling factor to be applied to the determined absolute resistance value to generate a compensated absolute resistance value.

9. Compensation circuitry according to claim 8, wherein the processing circuitry is configured to determine a signal validity metric based on the compensated absolute resistance value and the monitored voltage.

10. Compensation circuitry according to claim 9, wherein the processing circuitry is configured to compare the signal validity metric to a signal validity threshold and to enable processing of a force sensor output signal or a compensated force sensor output signal if the signal validity metric exceeds the signal validity threshold.

11. Compensation circuitry according to claim 10, wherein the processing circuitry is configured to compare the force sensor output signal or the compensated force sensor output signal to a threshold or to a known signature for a valid user input to determine whether the compensated force sensor output signal corresponds to a valid user input.

12. Compensation circuitry according to claim 1, wherein the processing circuitry is operative to adjust the one or more operating parameters of the force sensor system based at least in part on the determined absolute resistance value in response to a predetermined condition, wherein the predetermined condition is based on one or more of:
   a comparison of the determined absolute resistance value of the force sensor to a predetermined threshold;
   a comparison of a relative change in the absolute resistance of the force sensor to a target change over time;
   a comparison of the determined absolute resistance of the force sensor to an output voltage of the force sensor; or
   a comparison of the absolute resistance of a plurality of different force sensors.

13. Compensation circuitry for compensating for a thermal effect on a resistive force sensor in a force sensor system, the compensation circuitry comprising:
   monitoring circuitry configured to monitor an absolute resistance of the force sensor, wherein the absolute resistance of the force sensor is determined based on a voltage across the force sensor and a current through the force sensor; and
   processing circuitry configured to process an output signal output by the resistive force sensor, wherein the processing circuitry is configured to monitor a voltage of the output signal and to adjust one or more operational parameters of the force sensor system based on the determined absolute resistance value and the monitored output voltage.

14. An integrated circuit comprising compensation circuitry according to claim 1.

15. Force sensor circuitry comprising a resistive force sensor and compensation circuitry according to claim 1.

16. A device comprising force sensor circuitry according to claim 15, wherein the device comprises a mobile telephone, a tablet computer, a laptop computer, a portable media player, a gaming device, a gaming controller, an in-vehicle entertainment system, or a battery powered device.

\* \* \* \* \*